United States Patent [19]
Todd

[11] 3,963,972
[45] June 15, 1976

[54] PORTABLE POWER PACKAGE

[76] Inventor: Gregory M. Todd, 1301 Hallbrook Drive, Columbia, S.C. 29210

[22] Filed: Mar. 14, 1975

[21] Appl. No.: 558,304

[52] U.S. Cl. ................................ 320/2; 136/181; 240/10.61; 307/150
[51] Int. Cl.² ........................................ H02J 7/00
[58] Field of Search ............................ 320/2–7, 320/13–17, 25; 240/10.6 R, 10.61, 10.66; 307/149, 150; 136/181, 166, 167, 182

[56] References Cited
UNITED STATES PATENTS

| | | | |
|---|---|---|---|
| 2,230,458 | 2/1941 | Hummert | 240/10.6 R |
| 2,978,596 | 4/1961 | Robirds | 320/2 X |
| 3,510,745 | 5/1970 | Futterer | 320/16 X |
| 3,809,968 | 5/1974 | Haberthur | 307/150 X |

Primary Examiner—J D Miller
Assistant Examiner—Robert J. Hickey
Attorney, Agent, or Firm—Clarence A. O'Brien; Harvey B. Jacobson

[57] ABSTRACT

A portable power package has a supporting box provided with a cavity arranged for receiving an electrical battery such as a conventional storage battery. Pairs of jacks and switches are mounted on the box in series with the battery and in parallel with one another for permitting lamps and appropriate appliances to be selectively connected to the battery by means of inserting a plug on the lamp or appliance into a mating jack provided on the box. A charger is arranged in the cavity of the box together with the battery for permitting the battery to be recharged by either a standard AC power source or by another battery, while additional space is provided in the cavity for storing the lamps, and the like, when the latter are not in use.

2 Claims, 5 Drawing Figures

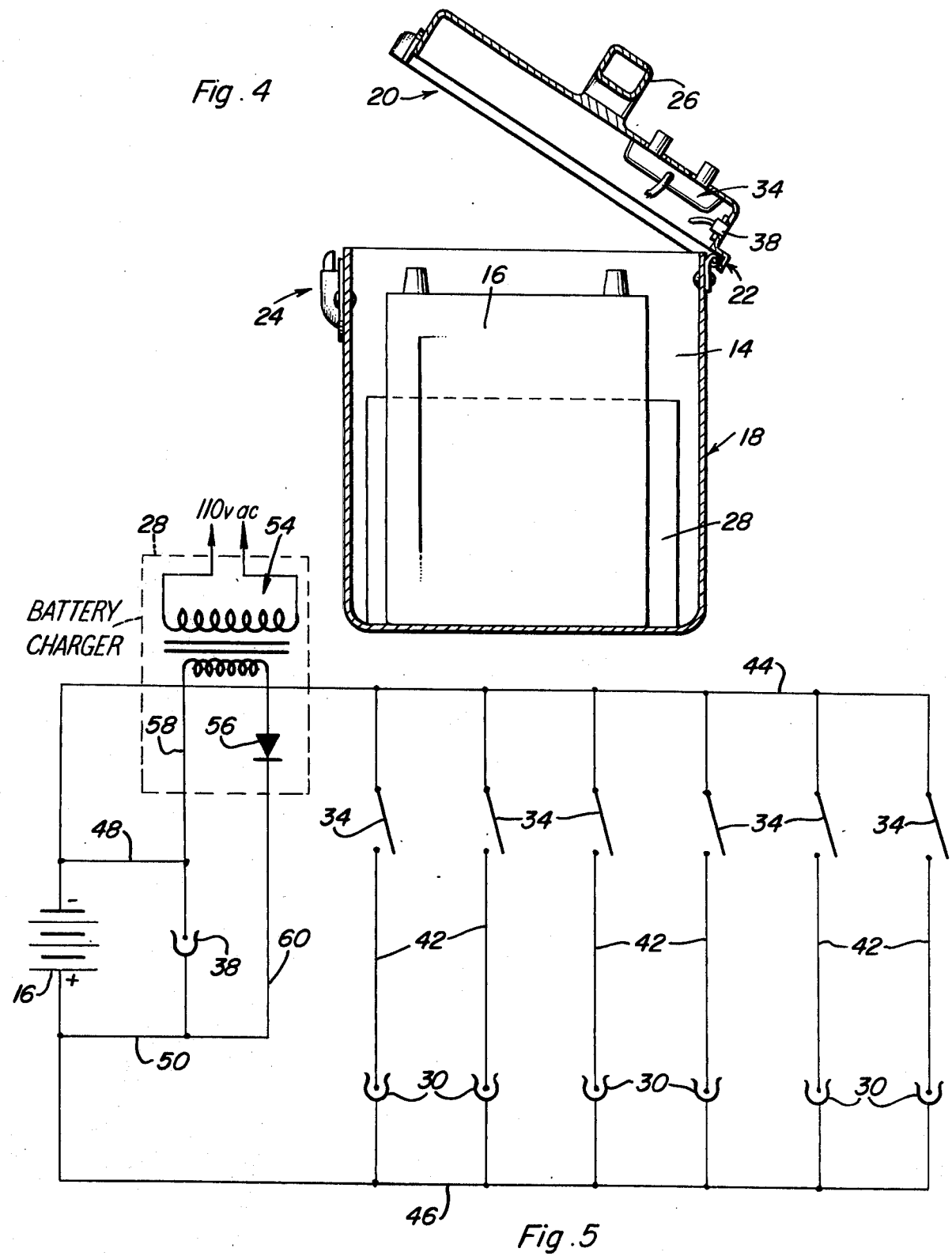

PORTABLE POWER PACKAGE

BACKGROUND OF THE INVENTION

1. Field of the Invention

This invention relates generally to a portable power package, and particularly to a self-contained source of direct current electric power which is usually transportable from place to place in order to make available electric power in areas, or under conditions, where the usual sources of electric power are unavailable.

2. Description of the Prior Art

Recent years have witnessed a great proliferation of battery powered lamps and appliances for use in conjunction with such popular leisure-time activities as camping, boating, and the like. The battery-powered appliances available for enhancing the enjoyment of such pursuits range from electric trolling motors and similar accessories for boats to small portable television sets. While these lamps and appliances are generally standardized to a conventional direct current electric system as conventinally employed in, for example, automotive electric systems, however, it frequently occurs that there is no motor vehicle, and the like, available to the site where the lamp and appliances are desired to be used. Further, many small pleasure boats are not equipped with electric systems. Even where the appropriate DC current is available, the problem frequently arises as to the operation of several lamps and/or appliances simultaneously from a single battery.

Prior patents believed pertinent to the present invention are as follows:

| | | |
|---|---|---|
| 360,934 | H. E. Waite | Apr. 12, 1887 |
| 1,518,508 | H. Hart | Dec. 9, 1924 |
| 2,160,528 | H. P. Dengler et al | Dec. 8, 1964 |
| 3,657,021 | J. P. Mathews | Apr. 18, 1972 |

SUMMARY OF THE INVENTION

It is an object of the present invention to provide a portable power package that permits the simultaneous operation of lamps and/or appliances from a single portable unit.

It is another object of the present invention to provide a portable power package that may be readily recharged from any available source of electricity.

It is still another object of the present invention to provide a portable power package which furnishes storage space therein for emergency lighting lamps, and the like.

These and other objects are achieved according to the present invention by providing a portable power package having: a supporting box provided with a cavity arranged for receiving an electric battery; an electric battery removably disposed in the cavity; a charger removably disposed in the cavity and electrically connected to the battery for selectively charging the battery; jacks mounted on the box and electrically connected to the battery for selectively receiving plugs of electrical appliances; and switches mounted on the box and electrically connected between the jacks and the battery for selectively connecting and disconnecting the jacks and the battery.

According to an advantageous feature of the present invention, each of the jacks is electrically connected in series with a respective one of the switches to form pairs of jacks and switches, with each of the pairs being electrically connected in series with the battery and in parallel with the other pairs. Further, there is preferably one more jack provided than there are switches, wherein the surplus jack is electrically connected in series with the battery and in parallel with the pairs of jacks and switches for electrically connecting the battery directly to an auxiliary electric power unit.

A lamp assembly is advantageously provided for being selectively, removably mounted on the jack of one of the pairs of jacks and switches so as to be supported by the box and electrically connected to the battery upon closing of the normally opened switch associated therewith. The lamp assembly is advantageously stored in the cavity of the box when the lamp assembly is not mounted on the jack of one of the jack-switch pairs.

According to another advantageous feature of the present invention, the box includes a container portion and a cover portion hinged to the container, with the jacks and switches being mounted on the cover portion and arranged for access from outside of the box.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a sectional view taken generally along the line 4—4 of FIG. 3, but with the cover portion of the package in a slightly different position.

FIG. 5 is a schematic diagram showing a preferred electrical circuit for the portable power package according to the present invention.

DESCRIPTION OF THE PREFERRED EMBODIMENTS

Figure 1:
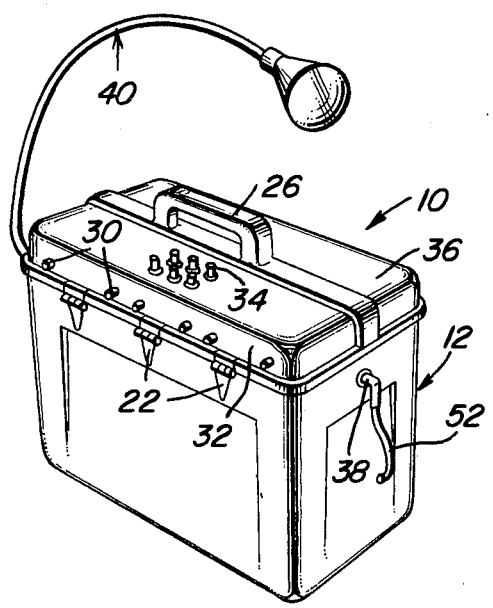
FIG. 1 is a perspective view showing a portable power package according to the present invention with a lamp assembly mounted thereon.
Figure 2:
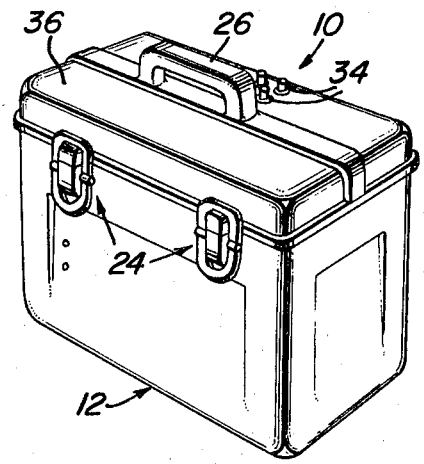
FIG. 2 is a perspective view similar to FIG. 1, but with the lamp assembly omitted and looking from the rear of the portable power package as seen in FIG. 1.
Figure 3:
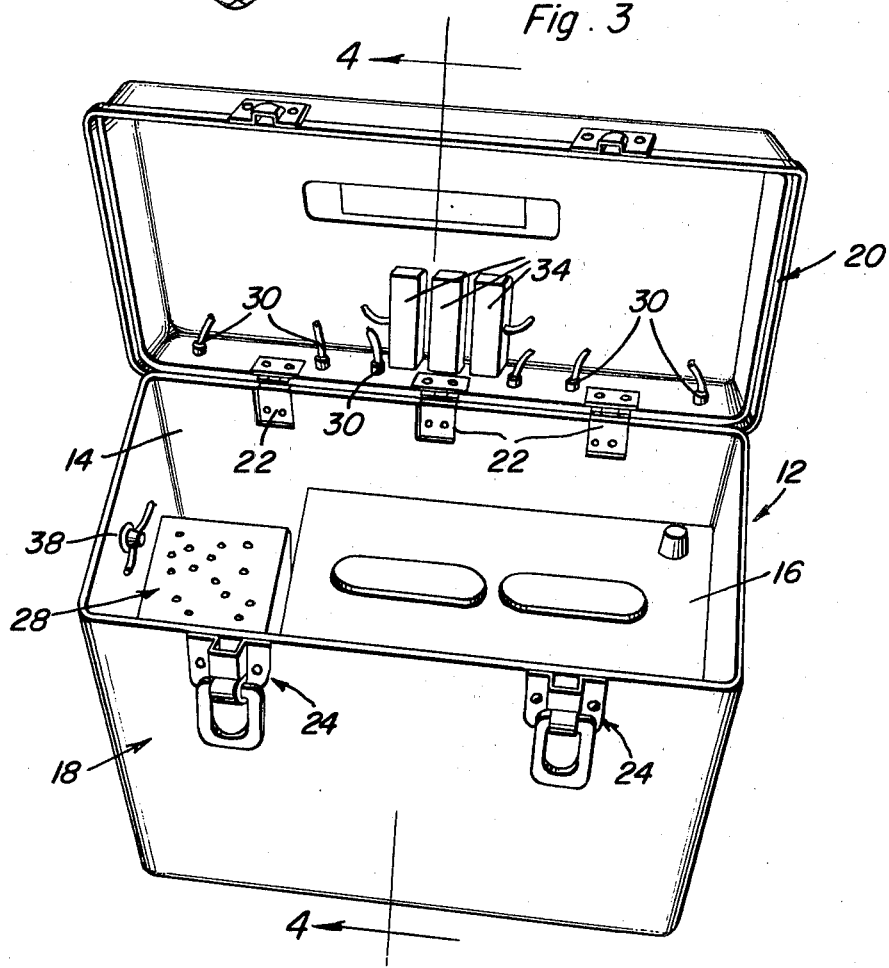
FIG. 3 is a perspective view showing the portable power package of FIGS. 1 and 2 in an open position for viewing the inside thereof.

Referring now more particularly to FIGS. 1 through 4 of the drawings, a portable power package 10 according to the invention has a box 12 provided with a cavity 14 arranged for receiving an electric battery 16 therein. Battery 16, which may be the illustrated 6- or 12-volt conventional storage battery commonly used in the electrical systems of motor vehicles, is removably disposed in cavity 14 as can be seen from FIGS. 3 and 4. Box 12 preferably includes a container portion 18 and a cover portion 20 keyed to container portion 18 as by the conventional hinges 22 which may be seen in FIGS. 1, 3, and 4. Conventional fasteners 24 are also provided on a side of box 12 opposite the side on which hinges 22 are disposed for permitting the cover portion 20 to be selectively secured to container portion 18. Fasteners 24 may be seen in FIGS. 2 through 4 of the drawings. Further, a handle 26 is advantageously provided on cover portion 20 in order to facilitate handling of box 12.

A charger 28 is immediately disposed in cavity 14 and is electrically connected to battery 16 for selectively charging the latter. While charger 28 will be discussed in greater detail below, it will be noted here that the housing for the elements of charger 28 advantageously is perforated in the conventional manner for permitting a flow, or circulation, of air about the elements of charger 28 for purposes of cooling these elements.

A plurality of conventional jacks 30 are illustrated as mounted on cover portion 20 of box 12 and are electrically connected, in a manner to be described below, to battery 16 for selectively receiving plugs (not shown) of suitable electrical devices. It will be appreciated that in the event of variations in the sizes of the plugs to be used in conjunction with package 10, jacks 30 of corresponding various sizes may be employed so as to permit package 10 to accommodate all of the various sizes of plugs. As can be seen from FIGS. 1, 3, and 4, jacks 30 are advantageously arranged as convenient along an edge 32 of cover portion 20, although other dispositions of jacks 30 may be employed as desired and convenient.

A plurality of conventional normally, open switches 34 are illustrated as disposed in the top 36 of cover portion 20. These switches 34 are electrically connected between jacks 30 and battery 16 for selectively connecting and disconnecting jacks 30 from battery 16. As can be seen from FIGS. 1 and 3, there is one more jack provided than switches 34. This extra jack, designated 38, is used to facilitate charging of battery 16 as by a conventional automotive electrical system (not shown), and the like, as will become clearer from the following discussion of the preferred electrical circuit according to the invention. As will be appreciated, however, the closing of the switch 34 associated with the particular jack 30 on which lamp 40 is mounted will cause a flow of current from battery 16 to lamp assembly 40 for energizing the latter and causing same to give off light.

Referring now more particularly to FIG. 4 of the drawings, a preferred electrical circuit is set forth systematically therein. As will be readily seen from this schematic diagram, each jack 30 is electrically connected in series with an associated one of the switches 34 to form a jack-switch pair. Each of the pairs thus formed is also seen as electrically connected in series with battery 16 and in parallel with the other such pairs. More specifically, wires 42, of which six are illustrated in FIG. 5, connect associated jacks 30 and switches 34 in series and are themselves connected between a pair of wires 44 and 46 connected to respective poles of battery 16. Further, wires 48 and 50 are also connected to the poles of battery 16 and to jacks 38 for connecting the latter in series with battery 16. Referring again to FIG. 1, a cable 52 may be associated with jacks 38 for electrically connecting battery 16 directly to an auxiliary electric power unit, such as the aforementioned automotive electric system. In this manner, battery 16 may be recharged whenever the engine of a motor vehicle, boat, and the like, is operating.

Referring again to FIG. 4 of the drawings, charger 28 can be seen to include a conventional power transformer 54, the primary of which is connected to a standard 110 volt AC source, and the like, and the secondary of which is connected across battery 16. The AC current is of course rectified in the usual manner as by a conventional power diode 56. The wires connecting the secondary of transformer 54 across battery 16 are designated 58 and 60, with diode 56 being inserted into wire 60. Since the construction of such chargers is known per se, it will not be discussed in greater detail herein.

As will be appreciated from the above description and from the drawings, a package 10 provides a container for the ordinary automotive type battery together with various receptacles, or jacks, and switches for use with commercially available, and specially constructed, devices (not shown) that use, for example, 12-volt electricity. Examples of such devices are bilge pumps for boats, electric fishing motors, depth finders, air compressors, television sets, emergency communication equipment, and the like. Further, box 12 also comes complete with a charger 28 that will recharge the battery 16 from any conventional, for example, AC source, and the like.

An especially advantageous feature of package 10 is that three, or even more, special lamps, such as lamp assembly 40, may be used for lighting wherever such may be required. For example, suitable lamp assemblies may be provided for lighting tents, for camping, in boats while night fishing, in cars for changing tires at night, or for emergency repairs on the road, for use at home during power failures, and the like. Further, sufficient space may be provided, and preferably is provided, within cavity 14 of box 12 to permit storage of one or more lamp assemblies such as lamp assembly 40 and extra lamps therefor.

Among other optional, or alternative, advantageous features which may be employed with a package 10 according to the present invention is the use of a bracket (not shown) specifically constructed for preventing movement of package 10 while same is in the, for example, trunk (not shown) of a motor vehicle, and the like. Further, a cigarette lighter adapter plug (not shown) as are known and conventionally used, will permit use of a lamp assembly such as assembly 40 with the battery of a motor vehicle (not shown) by means of the standard cigarette lighter receptacle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A portable power package, comprising, in combination:
  a. a supporting box having a cavity arranged for receiving an electric battery;
  b. an electric battery removably disposed in the cavity;
  c. charger means removably disposed in the cavity and electrically connected to the battery for selectively charging the battery;
  d. jack means mounted on the box and electrically connected to the battery for selectively receiving plugs of electrical devices; and
  e. switch means mounted on the box and electrically connected between the jack means and battery for selectively connecting and disconnecting the jack means to the battery; and the box includes a container portion and a cover portion hinged to the container portion, the jack means and switch means being mounted on the cover portion for access thereto from the outside of the box.

2. A portable power package, comprising, in combination:

a. a supporting box having a cavity arranged for receiving an electric battery;

b. an electric battery removably disposed in the cavity;

c. charger means removably disposed in the cavity and electrically connected to the battery for selectively charging the battery;

d. jack means mounted on the box and electrically connected to the battery for selectively receiving plugs of electrical devices; and e. switch means mounted on the box and electrically connected between the jack means and battery for selectively connecting and disconnecting the jack means to the battery; the jack means includes a plurality of jacks and the switch means a plurality of normally-open switches, each of the jacks being electrically connected in series with their respective one of the switches to form switch-jack pairs, each of the pairs being electrically connected in series with the battery and in parallel with the other such pairs; further including a lamp assembly selectively, removably mounted on the jack of one of the switch-jack pairs and supported by the box, the lamp assembly being energized by closing of the switch included in the one of the pairs, the lamp assembly being stored in the cavity provided in the box when the lamp assembly is not mounted on one of the jacks; the jack means includes one more jack than the switch means includes switches, the surplus jack being electrically connected in series with the battery and in parallel with the pairs, and arranged for electrically connecting the battery directly to an auxiliary source of direct current for recharging the battery; and the box includes a container portion and a cover portion hinged to the container portion, the jack means and switch means being mounted on the cover portion for access thereto from the outside of the box.

* * * * *